(12) United States Patent
Kiyotani et al.

(10) Patent No.: US 7,471,056 B2
(45) Date of Patent: Dec. 30, 2008

(54) CONTROL DEVICE

(75) Inventors: Shingo Kiyotani, Tsukuba (JP);
Nobuhiro Ishikawa, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 390 days.

(21) Appl. No.: 11/291,452

(22) Filed: Dec. 1, 2005

(65) Prior Publication Data
US 2006/0119307 A1 Jun. 8, 2006

(30) Foreign Application Priority Data
Dec. 2, 2004 (JP) .............................. 2004-350396

(51) Int. Cl.
*G05D 23/275* (2006.01)

(52) U.S. Cl. .................. 318/632; 318/568.18; 318/651; 318/652

(58) Field of Classification Search ................. 318/632, 318/568.18, 651, 652
See application file for complete search history.

(56) References Cited
U.S. PATENT DOCUMENTS 4,742,285 A 5/1988 Sasaki et al.
5,142,210 A 8/1992 Kojima et al.

FOREIGN PATENT DOCUMENTS

| EP | 0 364 593 | 4/1990 |
|----|-----------|--------|
| JP | 61170805  | 8/1986 |
| JP | 63101901  | 5/1988 |
| JP | 04260906  | 9/1992 |
| JP | 2004-118635 | 4/2004 |

*Primary Examiner*—Rina I Duda
*Assistant Examiner*—Erick Glass
(74) *Attorney, Agent, or Firm*—Rankin, Hill & Clark LLP

(57) ABSTRACT

A control device includes a first switch (400) by which an input signal to a motor speed control loop (910) is selected from a signal of a position control loop (300) and a signal of the speed control loop (200), and a switch controller (500) that controls switching of the first switch (400), so that the first switch (400) can switch between a quadruple loop (a current control loop, the motor speed control loop, the speed control loop (200) and the position control loop (300)) with the speed control loop (200) embedded therein, and a triple loop (the current control loop, the motor speed control loop and the position control loop (300)) without the speed control loop (200), corresponding to a transient state and a steady state.

12 Claims, 11 Drawing Sheets

CONTROL DEVICE

BACKGROUND OF THE INVENTION

1. Field of the Invention

The present invention relates to a control device and, in particular, the present invention relates to a servomechanism that controls a position and a speed of a load driven by a motor or the like.

2. Description of Related Art

There has been known a servomechanism that controls a position and a speed of a load which is an element driven by a motor or the like according to a target command, the servomechanism, for instance, being utilized for a numerical control machine tool or a numerical control coordinate measuring machine.

To drive and control a low rigid load causing vibrating response in a displacement, a speed and an acceleration thereof since a low rigid portion is provided at a connection with the motor for instance, a servomechanism has been utilized, which includes a quadruple loop control system having a load speed control loop in addition to a current control loop, a motor speed control loop and a position control loop (for instance, see Document 1: JP-A-2004-118635).

Such servomechanism is shown in FIG. 9.

In FIG. 9, a transfer characteristic of a motor speed control loop 910 with the current control loop is expressed as $G_M$, and a characteristic of a load 110 is expressed as $G_F$.

Though detail configuration is omitted, the current control loop has a motor, a motor drive power amplifier, a motor torque current detector and a current characteristic compensator, whereas the motor speed control loop has a motor rotation position detector detecting a rotation position of the motor, a differentiator calculating a rotation speed of the motor by differentiating the rotation position of the motor, and a motor speed characteristic compensator.

A load speed control loop 920 has a differentiator 921 calculating a load speed by differentiating a position of the load 110, and a speed characteristic compensator 922 provided with a proportional compensator (gain Kp) 923 and an integral compensator (gain Ki) 924.

A position control loop 930 has a position detector 931 detecting a position of the load 110 and a position compensator 932.

By having the load speed control loop 920, vibration suppressiveness of the control system can be enhanced even when the rigidity of the load 110 is low, thereby controlling the position and the speed of the load 110 stably and highly accurately.

However, since the load speed control loop 920 of which response is slower than that of the position control loop 930 is located inside the position control loop 930, the load speed may result in an overshoot depending on a setting value of the compensator (for instance, the gains of the proportional compensator 923 and the integral compensator 924).

For example, FIG. 11 shows a simulation result of a load speed when a ramped target position command $p_r$ as shown in FIG. 10 is input. Referring to FIG. 11, the load speed results in the overshoot in a transient state.

SUMMARY OF THE INVENTION

An object of the present invention is to provide a control device enhancing vibration suppressiveness of a control system in a steady state, as well as realizing stable control even in a transient state.

A control device according to an aspect of the present invention performs a predetermined control for a controlled object, the control device including: a first control loop including a vibration-suppressive compensator that suppresses a vibrating behavior; a second loop arranged outside the first control loop, the second loop providing a response quicker than the first control loop; and a first switch provided on the upstream of the controlled object, an input to the controlled object being selected from a signal of the first control loop and a signal of the second control loop with switching operation of the first switch.

With the configuration, by switching with the first switch, the input to the controlled object can be selected from the signal of the first control loop and the signal of the second control loop. Accordingly, the signal to the controlled object is switched corresponding to, for example, the state of the controlled object, so that the controlled object can optimally be controlled constantly.

For example, the first control loop may sometimes provide slow response since the first control loop needs a certain time for vibration-suppressive compensation for an element having a vibration-suppressive function to suppress a vibrating behavior. Since such first control loop with the slow response is embedded, an overshoot may occur when the target value changes largely.

Meanwhile, according to the aspect of the present invention, the first control loop and the second control loop can be switched with the first switch, the control can realize quick response by the signal of the second control loop without the first control loop as well as the overshoot can be prevented, for instance, in the case that the target value changes largely. When the change of the target value is small, the first control loop can be embedded to perform the vibration-suppressive compensation for the controlled object, thereby enhancing the vibration suppressiveness.

By switching between the first control loop and the second control loop as described above, the optimum control can be performed by applying the first control loop and the second control loop corresponding to the state of the controlled object.

In addition, since the first control loop is excluded from the control loop in the state where the target value changes largely but is embedded in the control loop only when the target value is steady, the overshoot need not be suppressed in the transient state in view of control design of the first control loop, thus focusing on the vibration suppressiveness in the steady state. Consequently, the control performance such as the vibration suppressiveness in the steady state can be enhanced as desired, for instance, by setting a high gain in order to suppress the disturbance etc. when setting the control gain etc. of the first control loop.

As a result, for instance, the quick response of the second control loop provides quick approach to the target value with the overshoot prevented in the transient state, whereas the first control loop performs sufficient vibration-suppressive compensation in the steady state, thereby enhancing the control performance.

Preferably, in the above-described the control device, the second control loop may include a second proportional compensator that performs proportional compensation, and the first switch may be provided on the upstream of the controlled object, an input to the controlled object being selected from an output from the vibration-suppressive compensator and an output from the second proportional compensator with the switching operation of the first switch.

With this configuration, by switching with the first switch, the input to the controlled object is selected from the output of the vibration-suppressive compensator (the first control loop) and the output from the second proportional compensator (the second control loop). Accordingly, for instance, the quick response of the second control loop provides quick approach to the target value with the overshoot prevented in the transient state, whereas the first control loop performs sufficient vibration-suppressive compensation in the steady state, thereby enhancing the control performance.

Preferably, the above-described control device may further include: a first switch controller that controls the switching operation of the first switch, in which the first switch has a first terminal that mates the input to the controlled object with the output from the second proportional compensator and a second terminal that mates the input to the controlled object with the output from the vibration-suppressive compensator, and the first switch controller may allow the first switch to select the second terminal when a driven state of the controlled object is in a steady state, and allow the first switch to select the first terminal when the driven state of the controlled object is in a transient state.

With this configuration, when the first terminal of the first switch is selected, the input to the controlled object is considered as the signal from the second proportional compensator (the second control loop), and when the second terminal of the first switch is selected, the input to the controlled object is considered as the signal from the vibration-suppressive compensator (the first control loop). Then, the first switch switches to the first terminal or the second terminal corresponding to the transient state and the steady state of the controlled object under the control of the first switch controller. At this time, when the controlled object is in the steady state, the second terminal is selected, so that the stable control can be performed by suppressing the disturbance etc. with the vibration-suppressive compensator. On the other hand, when the controlled object is in the transient state, the first terminal is selected, so that the control can provide quick response with the second control loop (the second proportional compensator).

According to the switching operation of the first switch under the control of the first switch controller corresponding to the state of the controlled object (the transient state, the steady state), the controlled object is optimally controlled constantly.

Preferably, in the above-described control device, the first switch controller may control the switching operation of the first switch based on a load acceleration.

Preferably, in the above-described control device, the first switch controller may have a preset acceleration threshold as a threshold for determining a switching timing of the first switch, and the first switch controller may allow the first switch to select the first terminal when the absolute value of the load acceleration is greater than the acceleration threshold, and allow the first switch to select the second terminal when the absolute value of the load acceleration is smaller than the acceleration threshold.

With this configuration, to switch the first switch between the first control loop and the second control loop with the switching operation of the first switch when the driven state of the load is shifted between the transient state and the steady state, the driven state of the load is determined whether the transient state or the steady state based on the acceleration. At this time, since the acceleration becomes approximately zero in the steady state, the driven state of the load is determined whether the transient state or the steady state by determining largeness of the load acceleration relative to the predetermined acceleration threshold with the first switch controller.

Preferably, in the above-described control device, the first switch controller may control the switching operation of the first switch based on a load speed.

Preferably, in the above-described control device, the first switch controller may have a preset target speed of the load, the first switch controller may allow the first switch to select the first terminal when a difference between the load speed and the target speed is a predetermined value or greater, and the first switch controller may allow the first switch to select the second terminal when the difference between the load speed and the target speed is smaller than the predetermined value.

With this configuration, to switch between the first control loop and the second control loop with the switching operation of the first switch when the driven state of the load is shifted between the transient state and the steady state, the driven state of the load is determined whether the transient state or the steady state based on the load speed.

At this time, when the target position of the load is instructed from the outside, if the target speed is known in advance, the first switch controller determines whether the driven state of the load is the transient state or the steady state based on the difference between the target speed of the load and the load speed.

Preferably, in the above-described control device, a target position of the load instructed from the outside may be preset, the first switch controller may have a preset time information on which the driven state of the load is shifted between the transient state and a steady state, and the first switch controller may control the switching operation of the first switch based on the time information on which the driven state of the load is shifted between the transient state and the steady state.

With this configuration, to switch between the first control loop and the second control loop with the switching operation of the first switch when the driven state of the load is shifted between the transient state and the steady state, the switching operation of the first switch is performed at the preset switching time.

In other words, when the target position or the pattern of the target speed as well as the switching time at which the transient state and the steady state are switched is known in advance, the time information for switching between the transient state and the steady state is preset.

Then, the first switch controller allows the first switch to perform the switching operation according to the time information.

Preferably, in the above-described control device, the first control loop may include: an adjusting section that cancels a function of the vibration-suppressive compensator; and a second switch provided between the vibration-suppressive compensator and the adjusting section, the second switch switching the connection state of the vibration-suppressive compensator and the adjusting section between connecting state and disconnecting state.

As an example of that the adjusting section cancels the function of the vibration-suppressive compensator is a case where a transfer function of the adjusting section is the inverse of a transfer function of the vibration-suppressive compensator and a transfer function becomes "1" as the vibration-suppressive compensator connects to the adjusting section.

Preferably, the above-described control device may further include: a second switch controller that controls switching operation of the second switch, in which the vibration-suppressive compensator may have a first proportional compensator, and an integral compensator arranged parallel to the first proportional compensator, the vibration-suppressive compensator outputting the sum of an output value of the first proportional compensator and an output value of the integral compensator, the second switch may be provided between the integral compensator and the adjusting section, the second switch having a third terminal that mates an input to the integral compensator with an output from the adjusting section, and a fourth terminal that mates the input to the integral compensator with an input to the first proportional compensator, and the second switch controller may allow the second switch to switch to the fourth terminal from the third terminal when the first switch switches to the second terminal from the first terminal.

With this configuration, when the input to the controlled object is switched from (the signal of) the second control loop to (the signal of) the first control loop with the switching operation of the first switch, the second switch switches the connection state of the adjusting section and the vibration-suppressive compensator from connecting state to disconnecting state. In other words, when the input to the controlled object is switched from the signal of the second control loop to the signal of the first control loop, the second switch performs the switching operation from the third terminal to the fourth terminal under the control of the second switch controller.

Note that when the first switch switches from the second control loop to the first control loop with the switching operation, in the initial state, the adjusting section in the connecting state cancels the function of the vibration-suppressive compensator in the first control loop, so that the signal value does not change largely even if the input to the controlled object is switched from the signal of the second control loop to the signal of the first control loop. Thereafter, when the adjusting section is disconnected from the vibration-suppressive compensator with the second switch, the signal characteristically compensated by the vibration-suppressive compensator is output to the controlled object.

As state above, when the first switch switches to the first terminal (the first control loop) form the second terminal (the second control loop), the input to the controlled object will not change stepwise as the second switch shifts the relationship of the adjusting section and the vibration-suppressive compensator from the connecting state to the disconnecting state, and consequently, the input to the controlled object is smoothly shifted from the signal of the second control loop to the signal of the first control loop.

Preferably, in the above-described control device, the second control loop may include a second proportional compensator that performs proportional compensation, the controlled object may be a load driven by a motor, the second control loop may includes a position detector that detects a load position, and a position comparator that compares the load position detected by the position detector with a target position instructed from the outside to output a position deviation to the second proportional compensator, the second proportional compensator may output a load speed command based on the position deviation, and the first control loop may include a speed detector that detects a load speed, and a speed comparator that compares the load speed detected by the speed detector with the load speed command from the second proportional compensator to output a load speed deviation.

The above-described configuration may be a servomechanism that controls the load position according to the target position instructed from the outside.

In particular, the load can further stably be controlled with vibration-suppressive compensator in the first control loop in the steady state when the load has low rigidity or a low rigid portion is arranged at a connection of the load and the motor, and also the overshoot etc. may be suppressed by performing the quick control using the second control loop without the first control loop in the transient state.

Preferably, in the above-described control device, the first control loop may include an order difference compensator corresponding to a resonant mode where the load is generated and having a characteristic where a relative order is zero.

With this configuration, the provision of the order difference compensator having the transfer characteristic of the zero relative order allows the transfer characteristic of the first control loop to be set as desired in some measure, thereby enhancing disturbance suppressiveness by setting a high gain of the vibration-suppressive compensator.

DETAILED DESCRIPTION OF PREFERRED EMBODIMENT(S)

Figure 1:
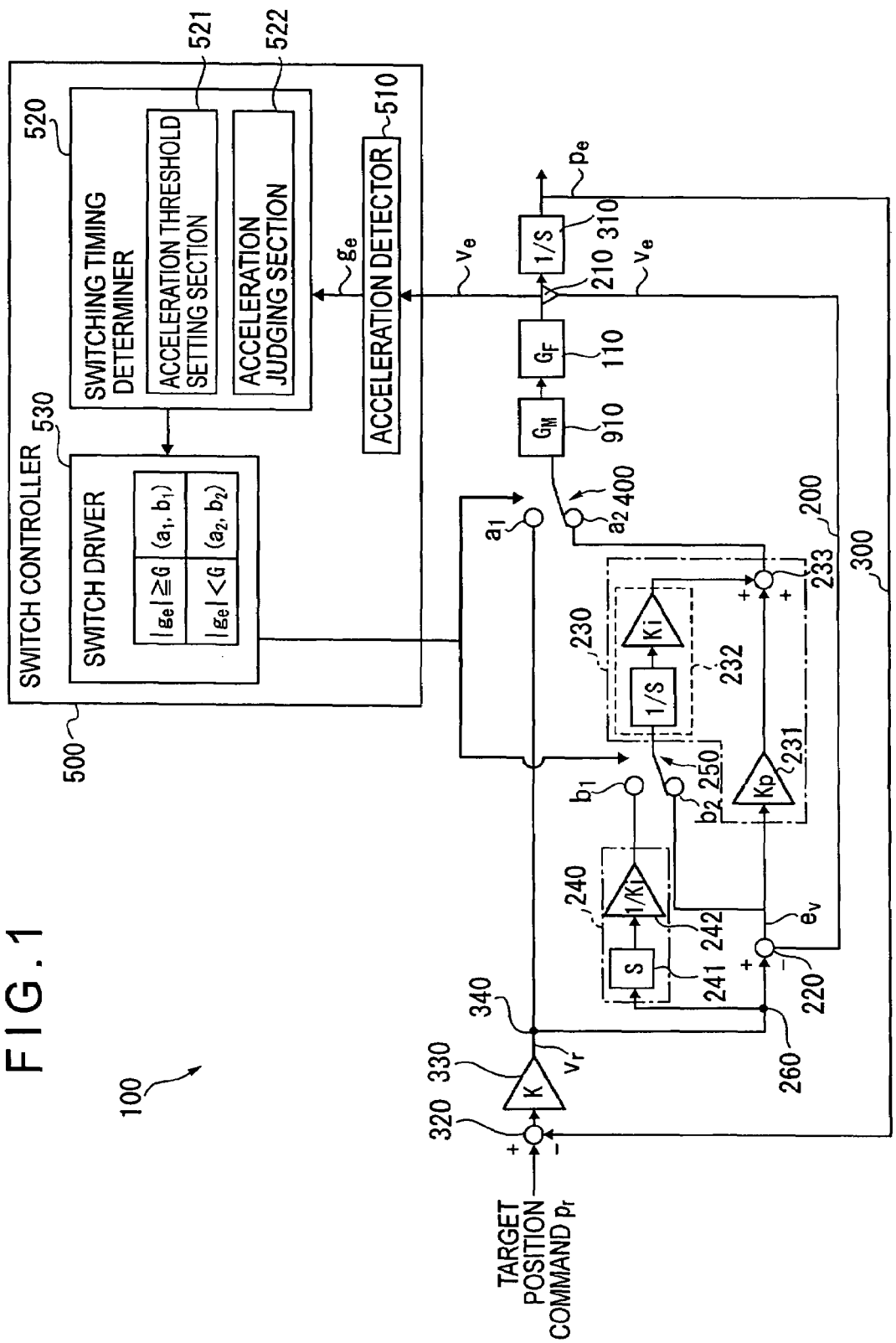
FIG. 1 is a block diagram showing a first embodiment of a servomechanism according to a control device of the present invention.

Embodiments of the present invention will be illustrated and explained with reference to reference characters provided for respective elements in the drawings.

First Embodiment

A first embodiment of a servomechanism as a control device of the present invention is described below.

Figure 2:
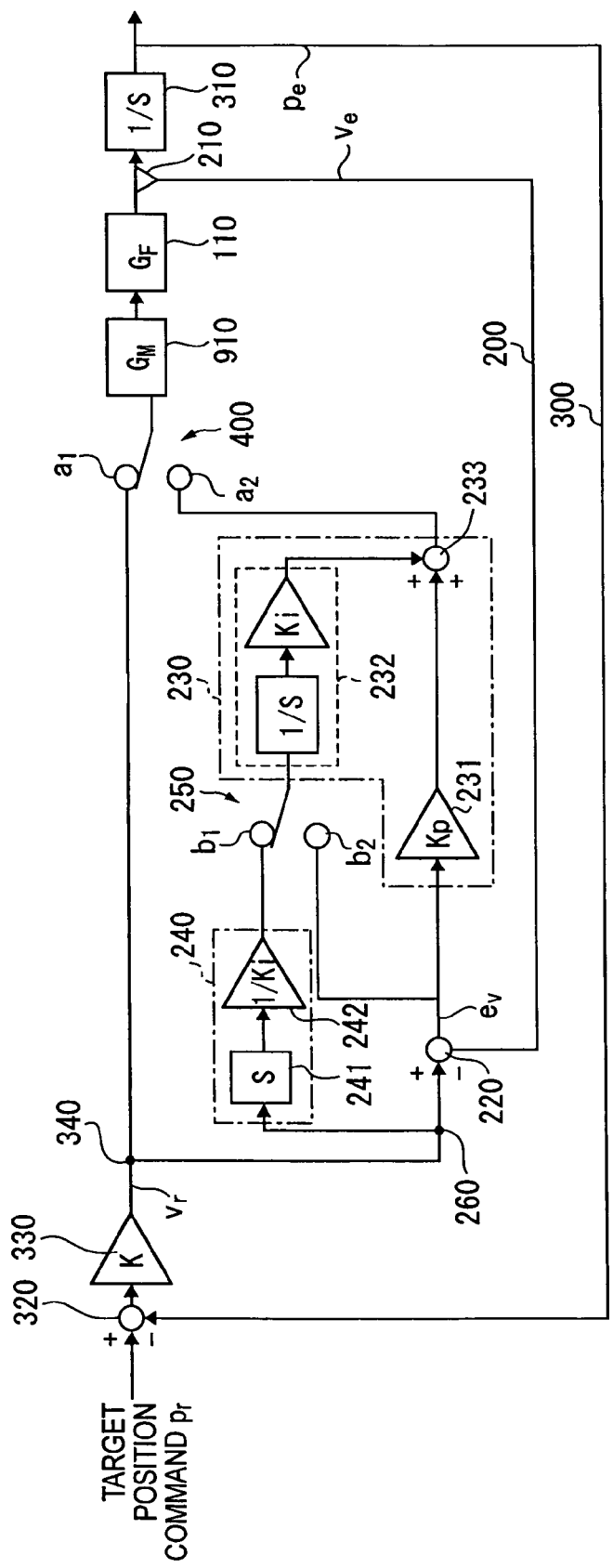
FIG. 2 is an illustration explaining switching operation of a first switch and a second switch in the first embodiment.
Figure 3:
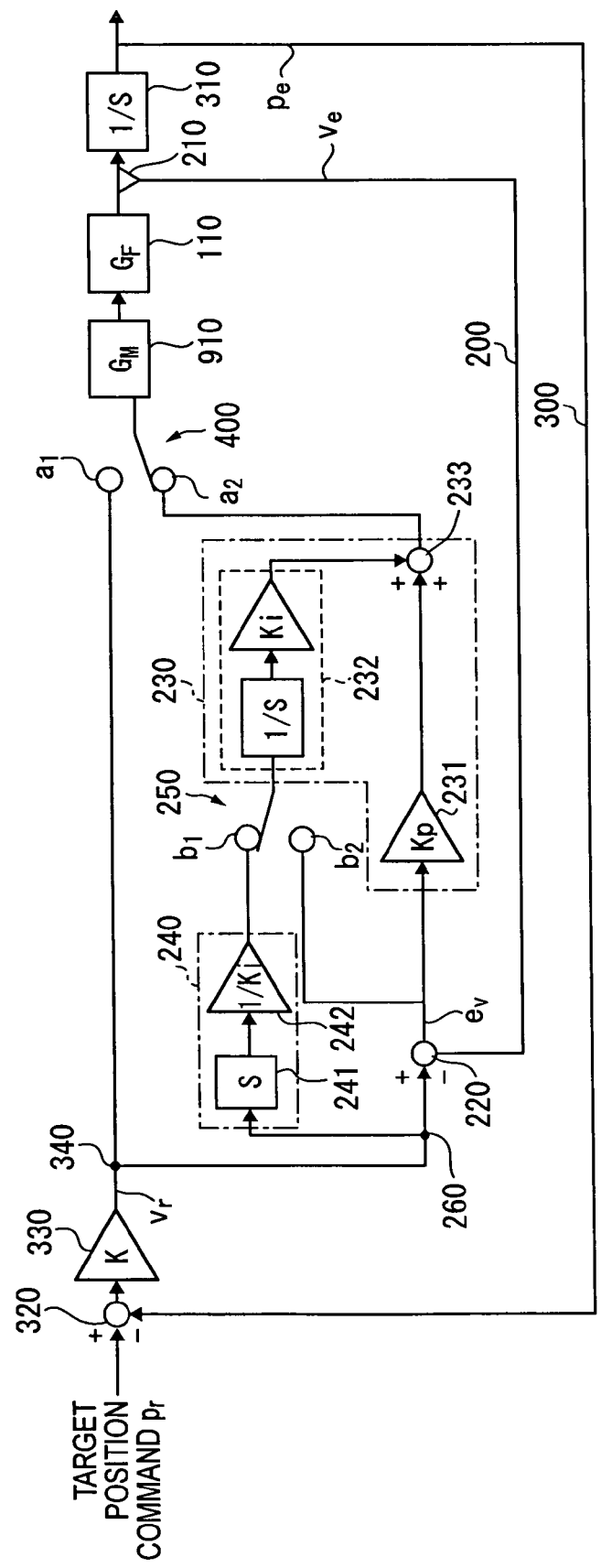
FIG. 3 is an illustration explaining the switching operation of the first switch and the second switch in the first embodiment.
Figure 4:
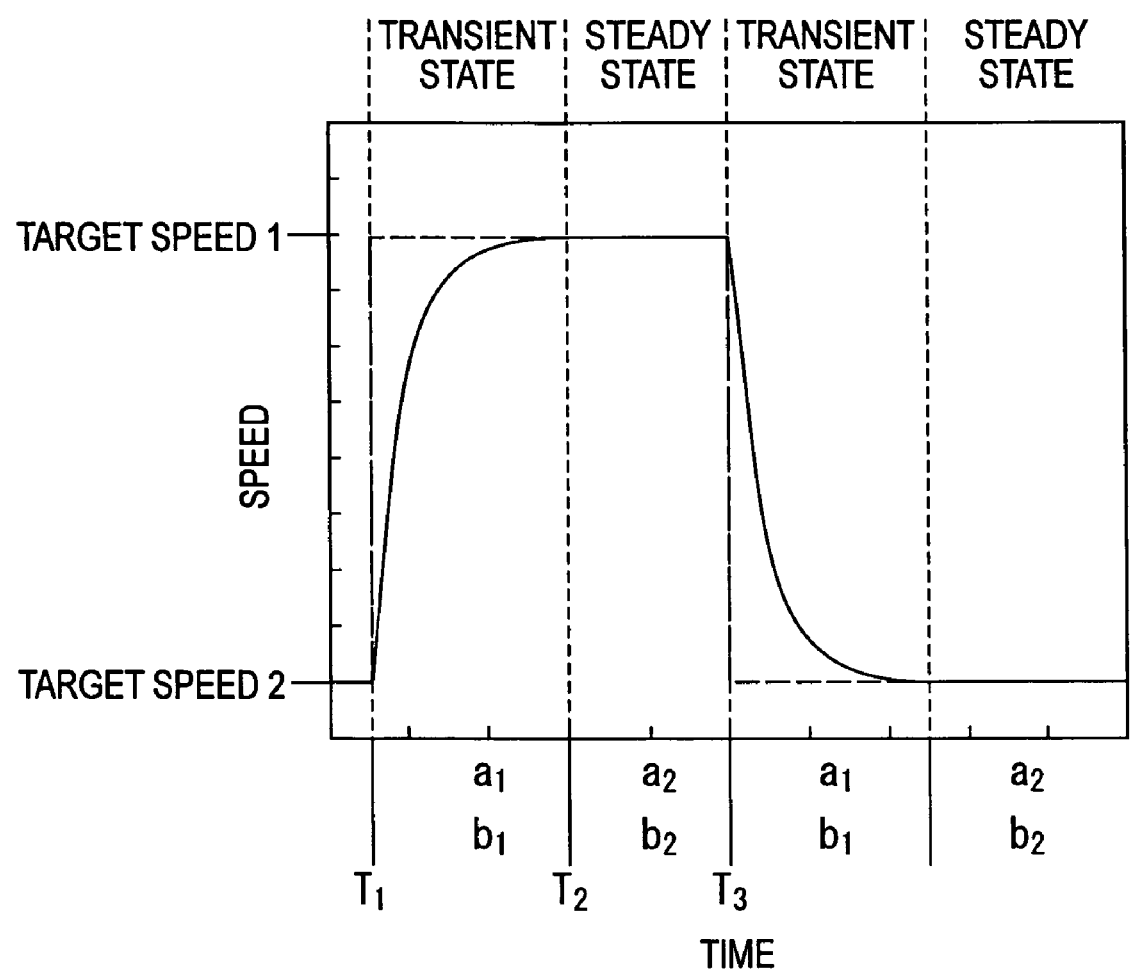
FIG. 4 is an illustration showing a simulation of change in a load speed in the first embodiment.

FIG. 1 is a block diagram showing the configuration of the first embodiment. FIGS. 2 and 3 are illustrations explaining switching operation of a first switch 400 and a second switch 250. FIG. 4 is a simulation result of change in a load speed when a target position command $p_r$ (see FIG. 10) is input to the first embodiment.

A servomechanism 100, as a whole, not only displaces a load 110 (a controlled object) with a motor (not shown) according to a target position command $p_r$ constantly input from the outside, but also controls a position and a speed of the load 110 by having, sequentially from the inner side, an applied current control loop (its path is not shown), a motor speed control loop (its path is not shown), a speed control loop 200 as a first control loop, and a position control loop 300 as a second control loop.

Although the transfer characteristic of the motor speed control loop 910 is expressed as $G_M$ and the characteristic of the load 110 is expressed as $G_F$, the applied current control loop may be included in the motor speed control loop 910 in the following description.

The servomechanism 100 includes the first switch 400 switching an input signal to the motor speed control loop 910 between a signal of the position control loop 300 and a signal of the speed control loop 200, and a switch controller 500 that controls switching operation of the first switch 400, so that the first switch 400 can switch between a quadruple loop (the current control loop, the motor speed control loop, the speed control loop 200 and the position control loop 300) with the speed control loop 200 embedded therein, and a triple loop (the current control loop, the motor speed control loop and the position control loop 300) without the speed control loop 200, corresponding to a transient state and a steady state.

The load 110 is not limited particularly, and may include a low rigid portion, or may be a low rigid portion arranged at a connection with the motor. Even in the case of low rigid load, vibration is suppressed with the configuration of the present invention, so that the stable control is provided.

The configuration of the first embodiment will be described below with reference to the block diagram of FIG. 1.

The position control loop 300 is a feedback loop arranged at the outermost position, the position control loop 300 including an integrator 310 (a position detector) that converts speed information from a speed detector 210 detecting a load speed $v_e$ into position information, a position comparator 320 that compares the load position information $p_e$ from the integrator 310 with the target position command $p_r$ input from the outside and performs subtraction, and a position compensator (a second proportional compensator) 330 that characteristically compensate the output from the position comparator 320.

The position compensator 330 outputs a speed command $v_r$ of the load 110.

The speed command $v_r$ from the position compensator 330 is split at a branch 340, so that one is directly output to the motor speed control loop 910 via the first switch 400, and another is input to the speed control loop 200.

The speed control loop 200 is arranged inside the position control loop 300.

The speed control loop 200 includes the speed detector 210 that detects the load speed $v_e$, a speed comparator 220 that compares the speed command $v_r$ output from the position compensator 330 with the load speed $v_e$ from the speed detector 210, a speed characteristic compensator (vibration-suppressive compensator) 230 that characteristically compensates the load speed $v_e$ relative to the output from the speed comparator 220, an adjusting section 240 that cancels the function of the speed characteristic compensator 230, and the second switch 250 by which an input to the speed characteristic compensator 230 is selected from the output of the speed comparator 220 and the output of the adjusting section 240. The speed comparator 220 subtracts the load speed $v_e$ detected by the speed detector 210 from the speed command $v_r$ of the position comparator 320 to output a speed deviation $e_v$.

The speed characteristic compensator 230 includes a proportional compensator (first proportional compensator) 231 which is a gain Kp proportionally compensating the output from the speed comparator 220, an integral compensator 232 which is a gain Ki connecting to the speed comparator 220 with the second switch 250 interposed and being provided parallel to the proportional compensator 231, and an adder 233 that adds the output of the integral compensator 232 to the output of the proportional compensator 231.

The adjusting section 240 is provided between the upstream of the speed comparator 220 and the second switch 250, the adjusting section 240 including a differentiator 241 that differentiates the speed command from the position comparator 320, and a multiplier 242 that multiplies the output of the differentiator 241 by the inverse number of the gain Ki of the integral compensator 232.

Namely, the transfer function is "1" obtained by combining the adjusting section 240 and the integral compensator 232.

The output from the multiplier 242 is output to the integral compensator 232 via the second switch 250.

The second switch 250 is provided on the upstream of the integral compensator 232, the second switch 250 including a third terminal $b_1$ connecting to the adjusting section 240 and a fourth terminal $b_2$ connecting to the speed comparator 220.

By switching between the third terminal $b_1$ and the fourth terminal $b_2$, the input to the integral compensator 232 is selected from the output of the adjusting section 240 and the output of the speed comparator 220.

The first switch 400 is provided on the upstream of the motor speed control loop 910, the first switch 400 including a first terminal $a_1$ directly connecting to the position compensator 330 and a second terminal $a_2$ connecting to the adder 233 (the speed control loop 200).

By switching between the first terminal $a_1$ and the second terminal $a_2$, the input to the motor speed control loop 910 is selected from the speed command $v_r$ of the position compensator 330 and the output of the adder 233.

The switch controller (a first switch controller and a second switch controller) 500 includes an acceleration detector 510 that differentiates the speed information $v_e$ from the speed detector 210 to detect an acceleration $g_e$ of the load 110, a switching timing determiner 520 that determines switching timing of the first switch 400 and the second switch 250 based on the load acceleration $g_e$ of the load, and a switch driver 530 that drives the first switch 400 and the second switch 250 to switch according to the instruction from the switching timing determiner 520.

The switching timing determiner 520 includes an acceleration threshold setting section 521 having a preset acceleration threshold (G), which is a threshold for determining the switching timing of the first switch 400 and the second switch 250, and an acceleration judging section 522 that compares the load acceleration $g_e$ with the acceleration threshold G and judges largeness.

The acceleration threshold G is the threshold for determining whether the driven state of the load 110 is the steady state or the transient state, the acceleration threshold G being set to a predetermined value close to zero since the acceleration of the load 110 is approximately zero in the steady state.

The acceleration judging section 522 determines that the absolute value of the acceleration $g_e$ of the load 110 is greater or smaller than the acceleration threshold G, and outputs the result to the switch driver 530.

When the acceleration judging section 522 determines that the absolute value $|g_e|$ of the load acceleration $g_e$ is or greater than the acceleration threshold G, the switch driver 530 drives the first switch to select the first terminal $a_1$ and also drives the second switch 250 to select the third terminal $b_1$. When the acceleration judging section 522 determines that the absolute value $|g_e|$ of the load acceleration $g_e$ is smaller than the acceleration threshold G, the switch driver 530 drives the first switch 400 to select the second terminal $a_2$ and also drives the second switch 250 to select the fourth terminal $b_2$.

Operation of the first embodiment with the above-described configuration will be described below.

Figure 10:
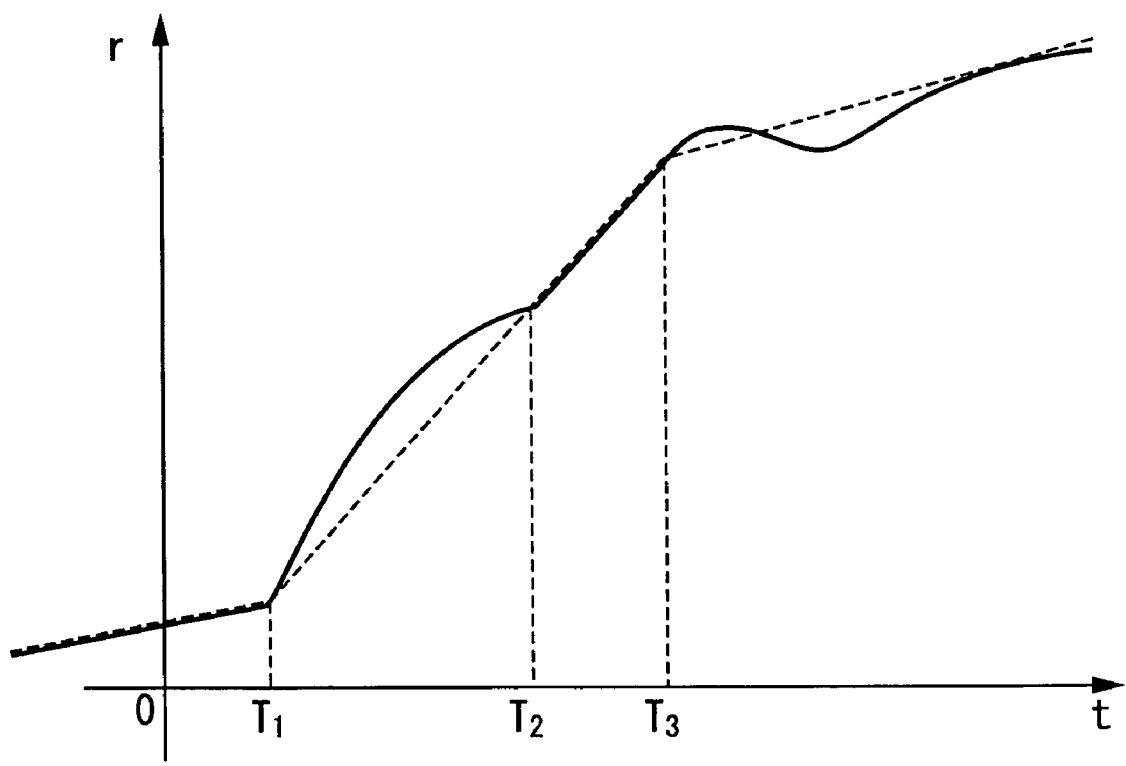
FIG. 10 is an illustration showing an example of a position target command input to the servomechanism.
Figure 11:
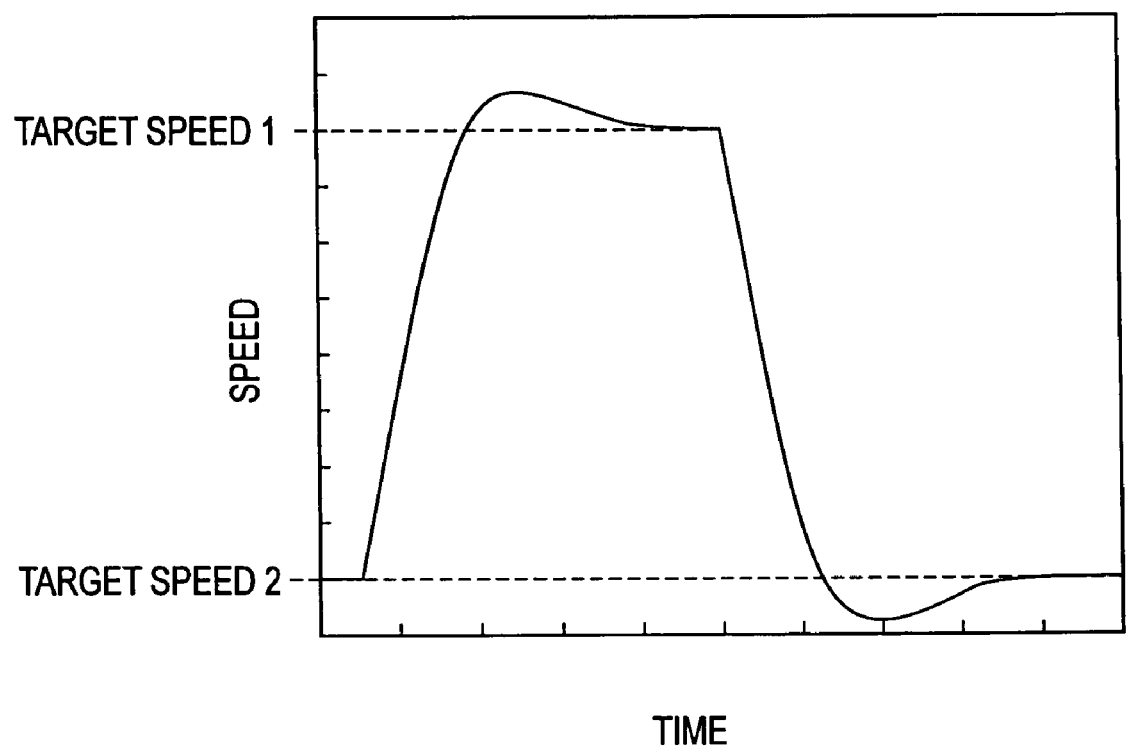
FIG. 11 is an illustration showing a simulation showing change in a load speed in the servomechanism of the related art.

It is assumed that, when the ramped target position command $p_r$ shown in FIG. 10 is input, the driven state of the load 110 is in the steady state at initial stage ($t<T_1$), the second terminal $a_2$ is selected by the first switch 400, and the fourth terminal $b_2$ is selected by the second switch 250.

Now, an exemplary case starting with the steady state ($t<T_1$), shifting to the transient state ($T_2>t\geq T_1$) and again shifting to the steady state ($t\geq T_2$) will be described.

First, a situation shifting from the steady state ($t<T_1$) to the transient state ($T_2>t\geq T_1$) will be described.

As the target position command $p_r$ is input, the position comparator 320 compares the target position command $p_r$ with the load position $p_e$ to output the position deviation $e_p$. The position deviation $e_p$ is proportionally compensated by the position compensator 330, so that the position compensator 330 outputs the speed command $v_r$.

Since the second terminal $a_2$ is selected by the first switch 400, the speed command $v_r$ from the position compensator 330 passes through the speed control loop 200, and then is input to the motor speed control loop 910 via the first switch 400, so that the load 110 is driven and controlled.

And besides, since the fourth terminal $b_2$ is selected by the second switch 250, the signal (speed command $v_r$) from the position compensator 330 does not pass through the adjusting section 240.

The speed command $v_r$ from the position compensator 330 is split at the branch 340, and input to the speed comparator 220, so that the speed comparator 220 compares the speed command $v_r$ with the speed information $v_e$ from the speed detector 210 to output the speed deviation $e_v$.

When the speed deviation $e_v$ is compensated by the proportional compensator 231 and the integral compensator 232 in the speed characteristic compensator 230, the signal from the proportional compensator 231 and the signal from the integral compensator 232 are added together by the adder 233. The signal from the adder 233 is input to the motor speed control loop 910 via the first switch 400 (the second terminal $a_2$), so that the load 110 is driven and controlled.

When the load 110 is driven and controlled according to the target position command $p_r$, the displacement of the load is differentiated and detected by the speed detector 210.

The speed information $v_e$ from the speed detector 210 is provided as a feedback to the speed control loop 200 as well as to the position control loop 300 via the integrator 310, and output to the switch controller 500.

In the switch controller 500, the speed information $v_e$ from the speed detector 210 is differentiated by the acceleration detector 510, and the acceleration information $g_e$ of the load 110 is output from the acceleration detector 510 to the switching timing determiner 520.

In the switching timing determiner 520, when the threshold G is preset in the acceleration threshold setting section 521 to determine whether the driven state of the load 110 is the transient state or the steady state, the acceleration judging section 522 compares the value (absolute value) of the load acceleration $g_e$ with the acceleration threshold G and judges largeness.

As shown in FIG. 10, when a target position commands $p_r$ different from $t<T_1$ and $T_2>t\geq T_1$ in grade is given, the load acceleration $g_e$ becomes greater, so that the acceleration judging section 522 judges that the absolute value of the load acceleration $g_e$ is greater than the acceleration threshold G.

The result judged by the acceleration judging section 522 is output to the switch driver 530.

In accordance with the judgment result judged by the acceleration judging section 522, the switch driver 530 drives the first switch 400 and the second switch 250 for the switching operation.

Since the acceleration judging section 522 judged that the absolute value $|g_e|$ of the load acceleration $g_e$ is greater than the acceleration threshold G, the switch driver 530 drives the first switch 400 and the second switch 250 for the switching operation such that the first switch 400 selects the first terminal $a_1$, and the second switch 250 selects the third terminal $b_1$.

According to the switching operation with the switches (the first switch 400 and the second switch 250), the control system shifts from the one with the speed control loop 200 embedded to the one without the speed control loop 200.

Then, operation in the transient state will be described.

FIG. 2 shows the state where the first switch 400 selects the first terminal $a$, and the second switch 250 selects the third terminal $b_1$.

In the transient state, (the value of) the acceleration $g_e$ of the load 110 becomes greater, so that the first switch 400 selects the first terminal $a_1$ and the second switch 250 selects the third terminal $b_1$ under the control of the switch controller 500 as long as the acceleration judging section 522 judges that the absolute value $|g_e|$ of the load acceleration $g_e$ is greater than the acceleration threshold G.

Since the first switch 400 initially selects the first terminal $a_1$, the speed command $v_r$ from the position compensator 330 is input to the motor speed control loop 910 via the first switch 400, so that the load 110 is driven and controlled.

Then, operation shifting from the transient state to the steady state will be described.

As the position of the load 110 moves closer to the target position command $p_r$ gradually and the driven state of the load 110 begins shifting to the steady state, the acceleration $g_e$ detected by the acceleration detector 510 comes closer to zero.

Accordingly, the acceleration judging section 522 judges that the value $|g_e|$ of the load acceleration $g_e$ becomes smaller than the acceleration threshold G. At this time, the switch driver 530 drives the first switch 400 to select the second terminal $a_2$ and also drives the second switch 250 to select the fourth terminal $b_2$.

FIG. 3 shows the state where the first switch 400 selects the second terminal $a_2$ and the second switch 250 keeps selecting the third terminal $b_1$ in the middle of the switching operation.

As shown in FIG. 3, when the first switch 400 selects the second terminal $a_2$, the speed command $v_r$ from the position compensator 330 is input to the motor speed control loop 910 via the speed control loop 200.

The speed command $v_r$ from the position compensator 330 is split at the branch 340, enters the speed control loop 200, and then split again at a branch 260.

The one signal split at the branch 260 via the speed comparator 220 is compensated by the proportional compensator 231 of the speed characteristic compensator 230 and input to the adder 233. At this time, since the driven state of the load 110 comes close to the steady state as well as the load speed comes close to the speed command $v_r$, the speed deviation $e_v$ is close to zero, and the output signal from the proportional compensator 231 is approximately zero.

Another signal split at the branch 260 passes through the adjusting section 240, the second switch 250 and the integral compensator 232, and then is input to the adder 233.

At this time since the adjusting section 240 applies the inverse of the transfer function of the integral compensator 232 while the transfer function combining the adjusting section 240 and the integral compensator 232 is "1", the signal split at the branch 260 is substantially directly input to the adder 233.

Since the signal from the proportional compensator 231 is approximately zero, and the signal passed through the adjusting section 240 and the integral compensator 232 is just the signal (the speed command $v_r$) from the position compensator 330, the signal output from the adder 233 is substantially equal to the speed command $v_r$ from the position compensator 330.

Accordingly, when the first switch 400 is switched to the second terminal $a_2$ from the first terminal $a_1$, the signal output from the adder 233 (the speed control loop 200) to the motor speed control loop 910 via the second terminal $a_2$ is the same as the speed command $v_r$ from the position compensator 330, namely, as the one before the first switch 400 is switched.

Then, when the second switch 250 is switched to the fourth terminal $b_2$ from the third terminal $b_1$ (FIG. 1 showing this state), the speed deviation $e_v$ from the speed comparator 220 is compensated by the proportional compensator 231 and the integral compensator 232 in the speed characteristic compensator 230. The signal from the proportional compensator 231 and the signal from the integral compensator 232 are added by the adder 233, so that the signal from the adder 233 is input to the motor speed control loop 910 via the first switch 400 (the second terminal $a_2$), and the load 110 is driven and controlled.

In the steady state, the vibration suppressiveness of the control system can be enhanced by the speed characteristic compensator 230 of the speed control loop 200, thereby stably controlling the load 110 by suppressing the influence of the disturbance etc.

According to the first embodiment with the above-described configuration, the following advantages can be attained.

(1) By switching the first switch 400, the input to the motor speed control loop 910 can be selected from the signal of the position control loop 300 and the signal from the speed control loop 200. As shown in FIG. 4, when the driven state of the load 110 is in the steady state, the load 110 can stably be controlled by enhancing the vibration suppressiveness with the speed characteristic compensator 230 of the speed control loop 200, and when the driven state of the load 110 is in the transient state, for instance the overshoot can be prevented by controlling the position of the load 110 to the target position with quick response according to the position control loop 300 excluding the speed control loop 200.

(2) Since the speed control loop 200 is excluded from the control system in the state where the target value changes largely but is embedded in the control system only when the target value is steady, the overshoot need not be suppressed in the transient state in view of control design of the speed control loop 200, thus focusing on the vibration suppressiveness in the steady state. Consequently, the control performance such as the vibration suppressiveness in the steady state can be enhanced as desired, for instance, by setting a high gain in order to suppress the disturbance etc. when setting the control gain etc. of the speed control loop 200.

(3) The adjusting section 240 is provided, so that the function of the integral compensator 232 is canceled while the adjusting section 240 connects to the integral compensator 232 in the speed control loop 200 at the time when the position control loop 300 is shifted to the speed control loop 200 by the switching operation with the first switch 400. Accordingly, even when the input to the motor speed control loop 910 is shifted from the signal of the position control loop 300 to the signal of the speed control loop 200, the signal value will not change largely. Consequently, when the first switch 400 is switched to the second terminal $a_2$ from the first terminal $a_1$, the input to the motor speed control loop 910 will not change stepwise, but will change smoothly from signal of the position control loop 300 to the signal of the speed control loop 200, so that the load 110 can stably be controlled even during the switching operation.

(4) To switch between the speed control loop 200 and the position control loop 300 with the switching operation of the first switch 400 when the driven state of the load 110 is shifted between the transient state and the steady state, the driven state of the load 110 is determined whether the transient state or the steady state based on the acceleration $g_e$. Since the state (the transient state, the steady state) of the load 110 is judged based on the acceleration $g_e$ of the load 110 detected in real time, the switching operation can appropriately be performed even when the state of the load 110 suddenly becomes the transient state due to the disturbance etc.

Second Embodiment

Next, a second embodiment of the present invention will be described.

The basic configuration of the second embodiment is the same as that of the first embodiment, but, is different in that the speed control loop has an order difference compensator.

Figure 5:
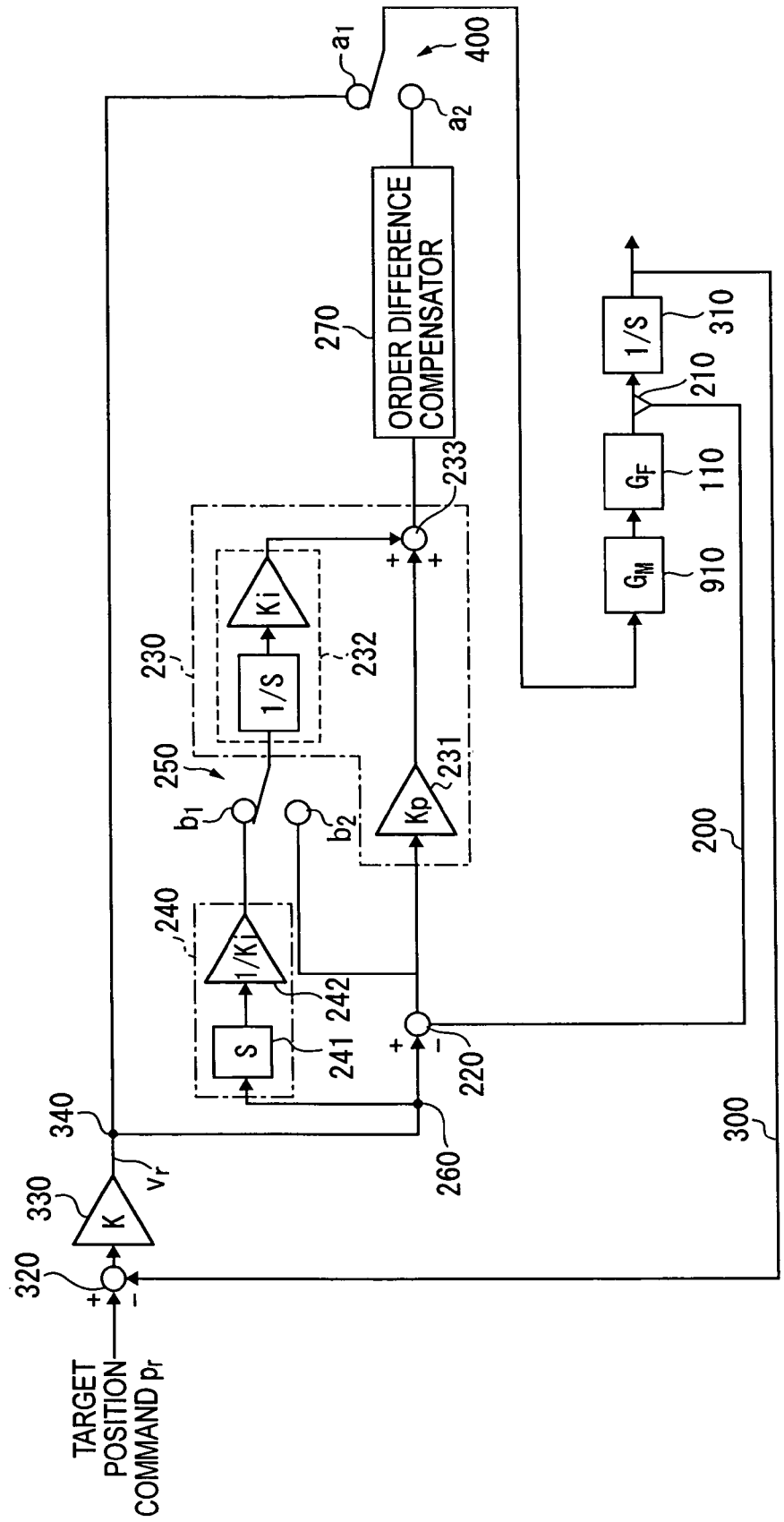
FIG. 5 is a block diagram showing a second embodiment of a servomechanism according to the control device of the present invention.

In FIG. 5, the speed control loop 200 has the order difference compensator 270 between the second terminal $a_2$ of the first switch 400 and the adder 233. Note that the switch controller 500 is omitted in FIG. 5 because the same is included in the first embodiment (FIG. 1).

A relative order of the transfer function of the order difference compensator 270 is zero, the transfer function being defined by a transfer characteristic of the load 110 and a dominant characteristic of the speed control loop 200 having the same order as that of the transfer characteristic of the load 110.

Here, the relative order of the transfer function means: (an order of a polynomial in "s" of the numerator)—(an order of the polynomial in "s" of the denominator) in a transfer function expressing the characteristic of the control system. Note that, "s" defines the Laplace operator.

Here is a specific example of the transfer function of the order difference compensator 270.

It is assumed that $\omega_z$ is a natural angular frequency of the vibration of the load, $\zeta_z$ is a damping coefficient ($0<\zeta_z<1$), and s is the Laplace operator, and then an angular frequency of $\omega_p > \omega_z$ and a coefficient of $\zeta_z \geq 1$ are set.

The characteristic $G_F$ of the load may be expressed by an Equation (1)

$$G_F = \frac{\omega_z^2}{S^2 + 2\zeta_z\omega_z + \omega_z^2} \qquad \text{Equation (1)}$$

Corresponding to the characteristic of the load, the dominant characteristic $G_n$ which is desired by the speed control loop may be expressed by an Equation (2) as a characteristic of the same order as that of the load 110.

$$G_n = \frac{\omega_p^2}{s^2 + 2\zeta_p\omega_p + \omega_p^2} \qquad \text{Equation (2)}$$

Then, the transfer function G of the order difference compensator 270 is expressed by an Equation (3).

$$G = \frac{\omega_p^2}{\omega_z^2} \cdot \frac{s^2 + 2\zeta_z\omega_z + \omega_z^2}{s^2 + 2\zeta_p\omega_p + \omega_p^2} \qquad \text{Equation (3)}$$

By having the above-stated order difference compensator 270, the relative order of the one-loop transfer characteristic is damped and a vibrating behavior is suppressed, thereby stably controlling the load 110.

By having the order difference compensator 270 having the transfer characteristic of the zero relative order, the transfer characteristic of the speed control loop 200 can be set as desired in some measure, so that the disturbance can be suppressed effectively since the gain Kp of the proportional compensator 231 and the gain Ki of the integral compensator 232 of the speed characteristic compensator 230 are set high by recovering a phase between the $\omega_z$ and $\omega_p$.

Even when the characteristic $G_F$ of the load 110 cannot be expressed accurately by the Equation (1), by applying the Equation (3) as the transfer function of the order difference compensator 270, the phase delay occurred at the frequency between the $\omega_z$ and $\omega_p$ can be recovered to improve the control characteristic.

Note that the second embodiment is similar to the first embodiment in that the first switch 400 and the second switch 250 are controlled by the switch controller to switch based on the acceleration of the load 110 corresponding to the transient state and the steady state.

Figure 6:
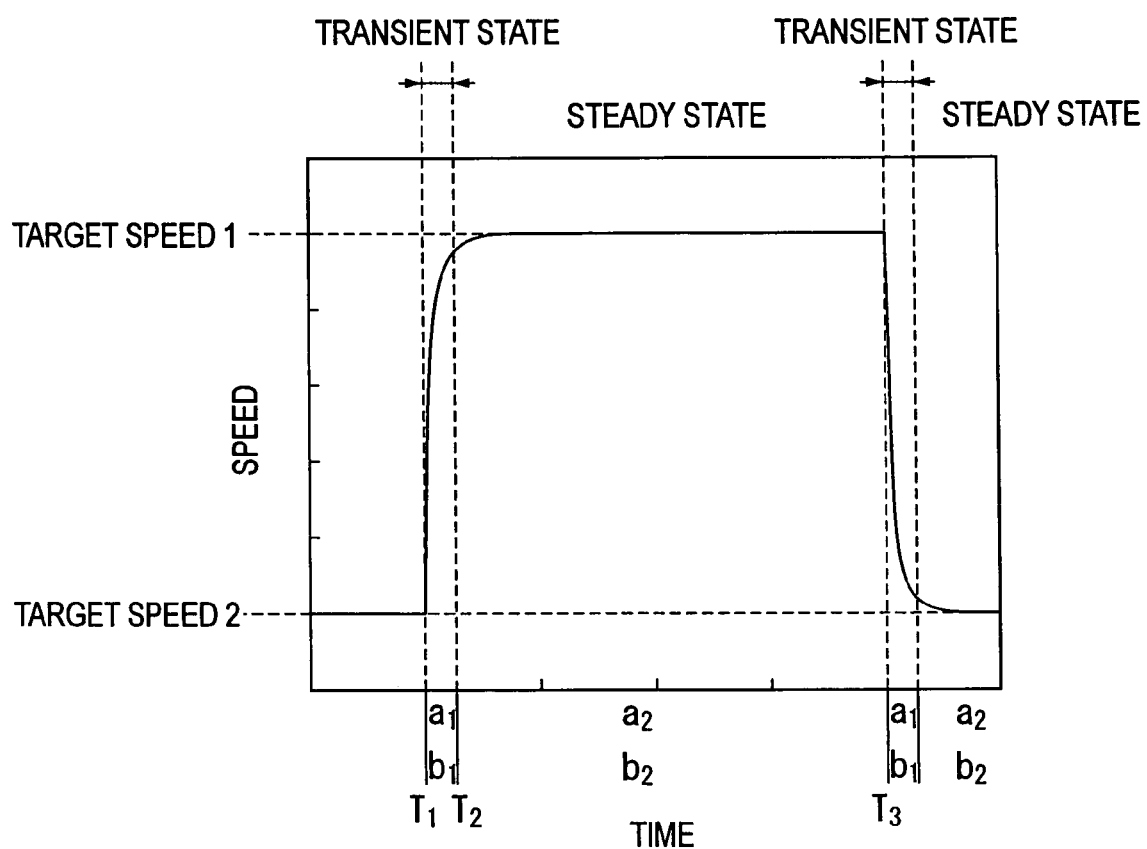
FIG. 6 is an illustration showing a simulation showing change in a load speed in the second embodiment.

FIG. 6 shows a simulation result of the load speed $v_e$ when the ramped target position command $p_r$ as shown in FIG. 10 is input to the servomechanism of the second embodiment. As illustrated in FIG. 6, the overshoot is suppressed and the stable control is realized in the transient state in accelerating or decelerating.

[Modification 1]

Next, a modification 1 of a servomechanism according to the control device of the present invention will be described below with reference to FIG. 7.

The basic configuration of the modification 1 is the same as the first embodiment, but, is different in that a switch controller 600 controls the switching operation of the first switch 400 and the second switch 250 based on preset switching time information.

Figure 7:
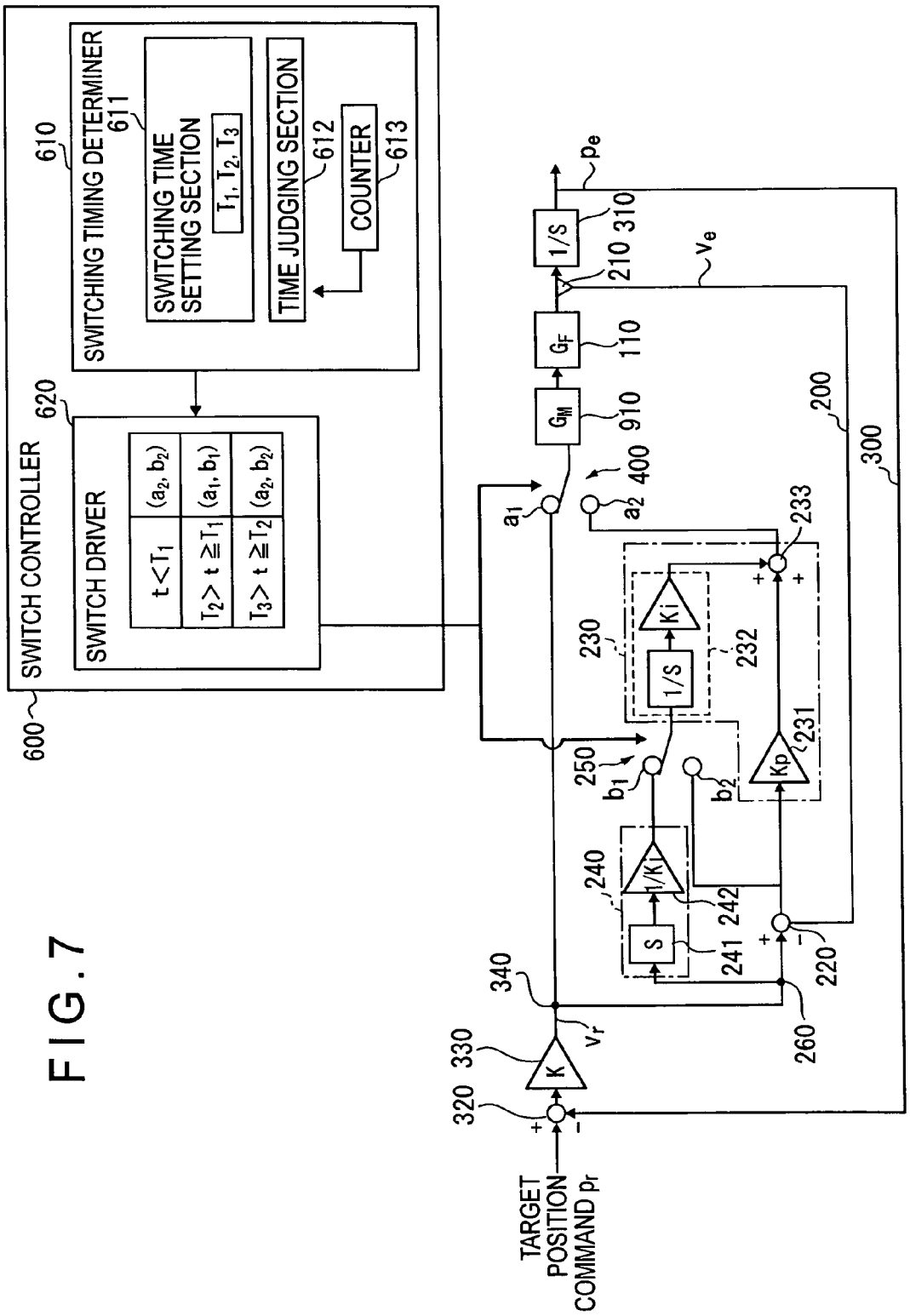
FIG. 7 is a block diagram showing a modification 1 of a servomechanism according to the control device of the present invention.

In FIG. 7, the switch controller 600 includes a switching timing determiner 610 and a switch driver 620, the switching timing determiner 610 having a switching time setting section 611, a time judging section 612 and a counter 613.

When the position (or the speed) instructed by the target position command $p_r$ is known in advance, the switching time setting section 611 has a preset time at which the driven state of the load 110 is shifted between the transient state and the steady state.

For example, when the target position command $p_r$ as shown in FIG. 10 is input, since t<$T_1$ defines the steady state, $T_1 \leq T_2$ defines the transient state and $T_2 \leq t<T_3$ defines the steady state, $T_1, T_2, T_3$... are preset as the switching time in the switching time setting section 611.

The time judging section 612 judges whether or not the time information from the counter 613 reaches the switching time ($T_1, T_2, T_3$), and outputs the judgment result to the switch driver 620.

The switch driver 620 drives the first switch 400 and the second switch 250 to perform the switching operation based on the judgment result of the time judging section 612.

For example, in the state of t<$T_1$ defining the steady state, the first switch 400 has selected the second terminal $a_2$ and the second switch 250 has selected the fourth terminal $b_2$. When the time judging section 612 provides an instruction that the state reaches t=$T_1$, the switch driver 620 drives the first switch 400 to select the first terminal $a_1$ and also drives the second switch 250 to select the third terminal $b_1$.

In the state of $T_2$>t$\geq T_1$ defining the transient state, the first switch 400 has selected the first terminal $a_1$ and the second switch 250 has selected the third terminal $b_1$. When the time judging section 612 provides an instruction that the state reaches t=$T_2$, the switch driver 620 drives the first switch 400 to select the second terminal $a_2$ and also drives the second switch 250 to select the fourth terminal $b_2$.

According to the modification 1, the switching operation of the first switch 400 and the second switch 250 is performed based on the preset time information, the first switch 400 and the second switch 250 can perform the switching operation at the best time without upsetting the timing. Consequently, the load can smoothly be driven according to the preset setting.

[Modification 2]

Next, a modification 2 of a servomechanism according to the control device of the present invention will be described below with reference to FIG. 8.

The basic configuration of the modification 2 is the same as the first embodiment, but, is different in that the switch controller 500 controls the switching operation of the first switch 400 and the second switch 250 based on the speed of the load.

Figure 8:
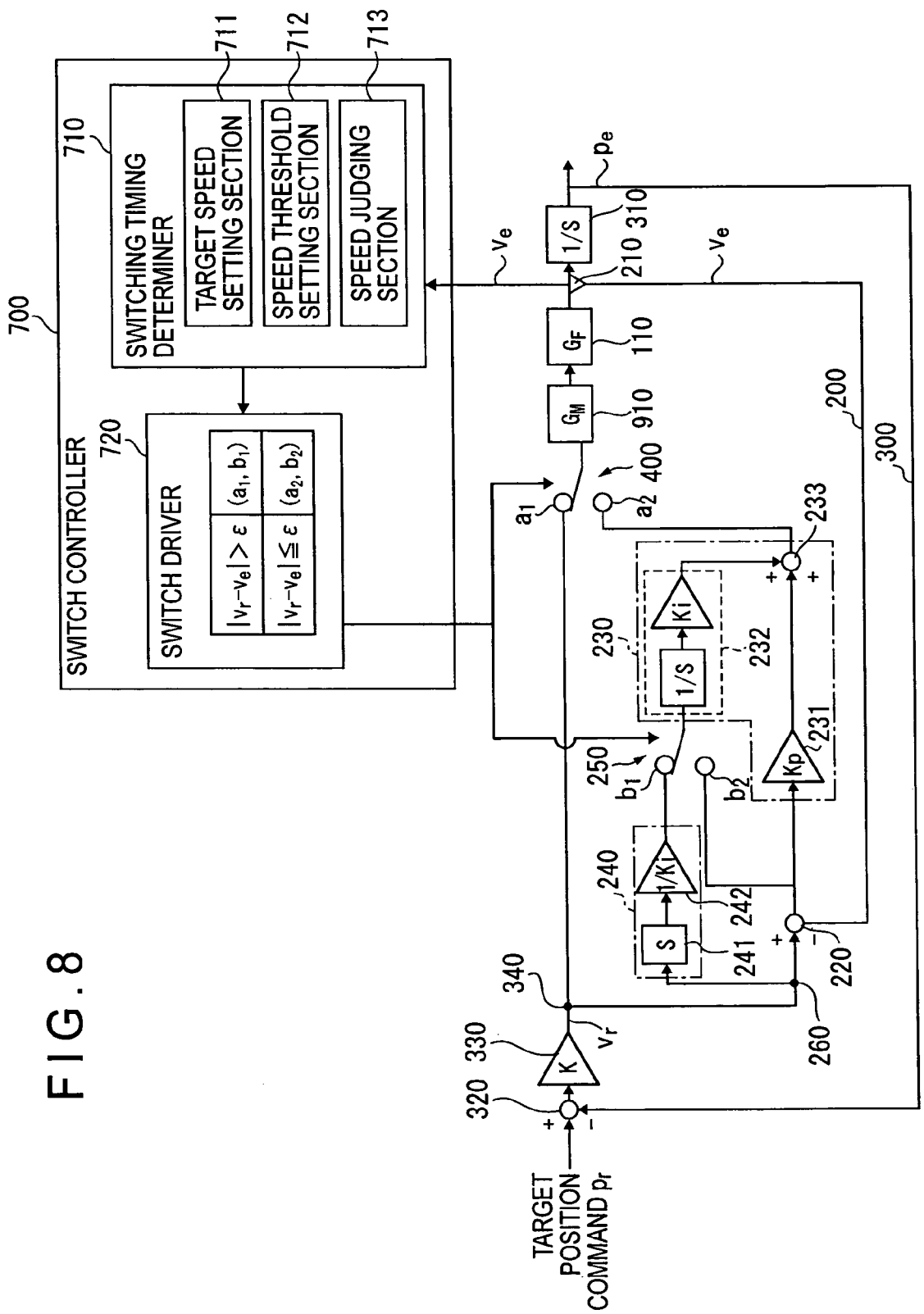
FIG. 8 is a block diagram showing a modification 2 of a servomechanism according to the control device of the present invention.
Figure 9:
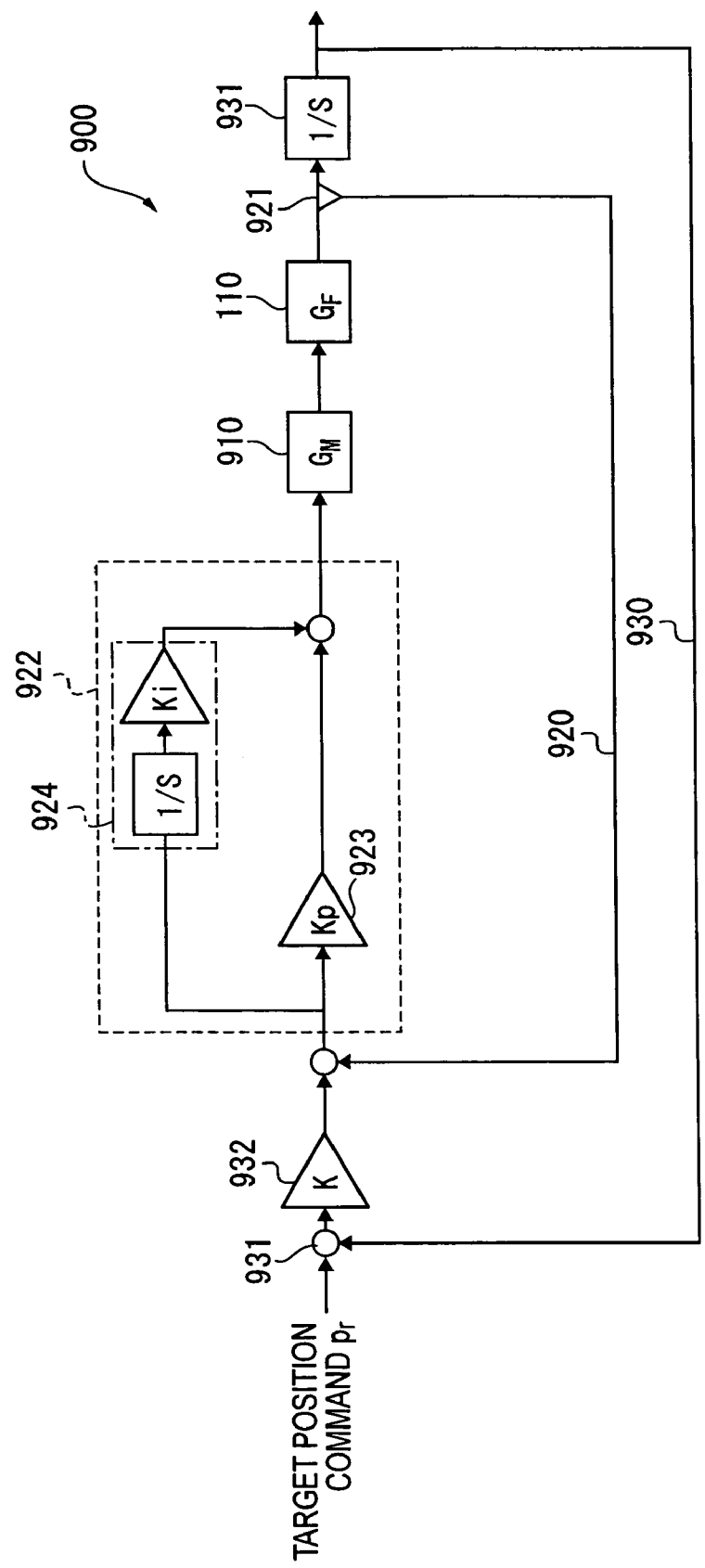
FIG. 9 is a block diagram showing a servomechanism according to a related art.

In FIG. 8, a switch controller 700 includes a switching timing determiner 710 and a switch driver 720, the switching timing determiner 710 having a target speed setting section 711, a speed threshold setting section 712 and a speed judging section 713.

When the pattern instructed by the target position command $p_r$ is known in advance and the target speed is preset, the target speed setting section 711 has a preset target speed. Note that the target speed setting section 711 could calculate the pattern of the speed command by differentiating the target position command $p_r$ to set the pattern of the speed command $v_r$ as the target speed.

The speed threshold setting section 712 has a preset speed threshold $\epsilon$ for determining the point at which the state is shifted from the transient state to the steady state based on the speed $v_e$ of the load 110.

The speed threshold $\epsilon$ is set as a threshold $\epsilon$ for determining whether or not the value (the absolute value) of the difference between the speed of the load 110 and the target speed is within a predetermined range, the range being set as 5% of the target speed for instance. When the value (the absolute value) of the difference between the speed $v_e$ of the load 110 and the target speed $v_r$ is within 5% of the target speed ($|v_r-v_e| \leq \epsilon$), the state can be determined as the steady state, and when the value (the absolute value) of the difference between the speed $v_e$ of the load 110 and the target speed $v_r$ exceeds 5% of the target speed ($|v_r-v_e| \geq \epsilon$), the state can be determined as the transient state.

The speed judging section 713 judges whether the absolute value ($|v_r-v_e|$) of the difference between the speed $v_e$ of the load 110 detected by the speed detector 210 and the target speed $v_r$ is greater or smaller than the speed threshold $\epsilon$. The judgment result is output to the switch driver 720.

When it is determined that the absolute value of the difference between the speed $v_e$ of the load 110 and the target speed $v_r$ ($|v_r-v_e|$) is greater than the speed threshold $\epsilon$, since the state is the transient state, the switch driver 720 drives the first switch 400 to select the first terminal $a_1$ and also drives the second switch 250 to select the third terminal $b_1$.

When it is determined that the absolute value of the difference between the speed $v_e$ of the load 110 and the target speed $v_r$ ($|v_r-v_e|$) is greater than the speed threshold $\epsilon$ by the speed judging section 713, since the state is the steady state, the switch driver 720 drives the first switch 400 to select the second terminal $a_2$ and also drives the second switch 250 to select the fourth terminal $b_2$.

According to the modification 2, since the switching operation of the first switch 400 and the second switch 250 are performed while the actual state of the load 110 is checked based on the speed of the load 110 detected by the speed detector 210, the control can appropriately be performed corresponding to the actual state (the steady state, the transient state) of the load 110. For instance, even when the state is suddenly shifted to the transient state due to the disturbance, performing the optimum control with the switching operation of the first switch 400 and the second switch 250 can correspond to the transient state quickly, thus stably controlling the load 110.

Note that the present invention is not limited to the above-described embodiments, and modifications, improvements etc. are included in the present invention as long as the object of the present invention can be achieved.

For example, in the above-described embodiments, the first control loop applies the speed control loop whereas the second control loop applies the position control loop, the control loops to be switched are not particularly limited, and the control loops may be modified in design corresponding to the controlled object.

The priority application Number JP2004-350396 upon which this patent application is based is hereby incorporated by reference.

What is claimed is:

1. A control device that performs a predetermined control for a controlled object, comprising:
a first control loop including a vibration-suppressive compensator that suppresses a vibrating behavior;
a second loop arranged outside the first control loop, the second loop providing a response quicker than the first control loop; and
a first switch provided on the upstream of the controlled object, an input to the controlled object is selected between a combination of a signal of the first control loop and a signal of the second control loop, and a signal solely of the second control loop bypassing the first control loop in accordance with switching operation of the first switch.

2. The control device according to claim 1, wherein the second control loop includes a second proportional compensator that performs proportional compensation, and the first switch is provided on the upstream of the controlled object, an input to the controlled object being selected from an output from the vibration-suppressive compensator and an output from the second proportional compensator with the switching operation of the first switch.

3. The control device according to claim 2, further comprising: a first switch controller that controls the switching operation of the first switch, wherein the first switch has a first terminal that mates the input to the controlled object with the output from the second proportional compensator and a second terminal that mates the input to the controlled object with the output from the vibration-suppressive compensator, and the first switch controller allows the first switch to select the second terminal when a driven state of the controlled object is in a steady state, and allows the first switch to select the first terminal when the driven state of the controlled object is in a transient state.

4. The control device according to claim 3, wherein the first switch controller controls the switching operation of the first switch based on a load acceleration.

5. The control device according to claim 4, wherein the first switch controller has a preset acceleration threshold as a threshold for determining a switching timing of the first switch, and the first switch controller allows the first switch to select the first terminal when the absolute value of the load acceleration is greater than the acceleration threshold, and allows the first switch to select the second terminal when the absolute value of the load acceleration is smaller than the acceleration threshold.

6. The control device according to claim 3, wherein the first switch controller controls the switching operation of the first switch based on a load speed.

7. The control device according to claim 6, wherein the first switch controller has a preset target speed of the load, the first switch controller allows the first switch to select the first terminal when a difference between the load speed and the target speed is a predetermined value or greater, and the first switch controller allows the first switch to select the second terminal when the difference between the load speed and the target speed is smaller than the predetermined value.

8. The control device according to claim 3, wherein a target position of the load instructed from the outside is preset, the first switch controller has a preset time information on which the driven state of the load is shifted between the transient state and a steady state, and the first switch controller controls the switching operation of the first switch based on the time information on which the driven state of the load is shifted between the transient state and the steady state.

9. The control device according to claim 1, wherein the first control loop includes: an adjusting section that cancels a function of the vibration-suppressive compensator; and a second switch provided between the vibration-suppressive compensator and the adjusting section, the second switch switching the connection state of the vibration-suppressive compensator and the adjusting section between connecting state and disconnecting state.

10. The control device according to claim 9, further comprising: a second switch controller that controls switching operation of the second switch, wherein the vibration-suppressive compensator has a first proportional compensator, and an integral compensator arranged parallel to the first proportional compensator, the vibration-suppressive compensator outputting the sum of an output value of the first proportional compensator and an output value of the integral compensator, the second switch is provided between the integral compensator and the adjusting section, the second switch having a third terminal that mates an input to the integral compensator with an output from the adjusting section, and a fourth terminal that mates the input to the integral compensator with an input to the first proportional compensator, and the second switch controller allows the second switch to switch to the fourth terminal from the third terminal when the first switch switches to the second terminal from the first terminal.

11. The control device according to claim 1, wherein the second control loop includes a second proportional compensator that performs proportional compensation, the controlled object is a load driven by a motor, the second control loop includes a position detector that detects a load position, and a position comparator that compares the load position detected by the position detector with a target position instructed from the outside to output a position deviation to the second proportional compensator, the second proportional compensator outputs a load speed command based on the position deviation, and the first control loop includes a speed detector that detects a load speed, and a speed comparator that compares the load speed detected by the speed detector with the load speed command from the second proportional compensator to output a load speed deviation.

12. The control device according to claim 11, wherein the first control loop includes an order difference compensator corresponding to a resonant mode where the load is generated and having a characteristic where a relative order is zero.

* * * * *